United States Patent
Katiyar et al.

(10) Patent No.: US 9,880,829 B2
(45) Date of Patent: Jan. 30, 2018

(54) METHOD AND APPARATUS FOR PERFORMING HITLESS UPDATE OF LINE CARDS OF A NETWORK DEVICE

(71) Applicant: Telefonaktiebolaget LM Ericsson (publ), Stockholm (SE)

(72) Inventors: Nitin Katiyar, Bangalore (IN); Nikhil Bhandari, Bangalore (IN); Satya Prakash, Bangalore (IN); Keshav Gupta, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 14/968,753

(22) Filed: Dec. 14, 2015

(65) Prior Publication Data

US 2017/0168803 A1  Jun. 15, 2017

(51) Int. Cl.
  *G06F 9/44* (2006.01)
  *G06F 9/445* (2006.01)
  (Continued)

(52) U.S. Cl.
  CPC .......... *G06F 8/65* (2013.01); *G06F 8/67* (2013.01); *G06F 9/45558* (2013.01); *H04L 41/082* (2013.01); *H04L 45/28* (2013.01); *H04L 45/56* (2013.01); *H04L 45/60* (2013.01); *H04L 67/34* (2013.01); *G06F 11/1484* (2013.01);
  (Continued)

(58) Field of Classification Search
  CPC ..... G06F 8/61; G06F 8/63; G06F 8/65; G06F 11/1484; G06F 11/1433; G06F 11/202; G06F 2009/4557
  See application file for complete search history.

(56) References Cited

U.S. PATENT DOCUMENTS

| 9,182,972 B2 | 11/2015 | Hanselmann |
| 2003/0177209 A1* | 9/2003 | Kwok ............. G06F 8/67 709/221 |

(Continued)

FOREIGN PATENT DOCUMENTS

WO  2015/145291 A1  10/2015

OTHER PUBLICATIONS

J. Postel, "User Datagram Protocol," Aug. 28, 1980, 3 pages, RFC: 768.

(Continued)

*Primary Examiner* — Duy Khuong T Nguyen
(74) *Attorney, Agent, or Firm* — Nicholson De Vos Webster & Elliott LLP

(57) ABSTRACT

A method in a first network device of performing a software update of a line card of a second network device without disruption to data traffic. The method includes causing a redundant control plane component of the second network device to be updated according to the software update. The method continues with causing the second network device to instantiate, based on the software update, a line card virtual machine (LC VM) as a redundant data plane component for the line card. The method further includes causing a third network device to forward data traffic to both the line card and the LC VM of the second network device, and causing the second network device to update the line card according to the software update while processing the received data traffic using the LC VM.

18 Claims, 9 Drawing Sheets

(51) Int. Cl.

| | |
|---|---|
| H04L 29/08 | (2006.01) |
| G06F 9/455 | (2006.01) |
| H04L 12/24 | (2006.01) |
| H04L 12/771 | (2013.01) |
| H04L 12/773 | (2013.01) |
| H04L 12/703 | (2013.01) |
| G06F 11/14 | (2006.01) |
| G06F 11/20 | (2006.01) |

(52) U.S. Cl.
CPC .. *G06F 11/202* (2013.01); *G06F 2009/45575* (2013.01); *G06F 2009/45595* (2013.01)

(56) References Cited

U.S. PATENT DOCUMENTS

| | | | | |
|---|---|---|---|---|
| 2008/0091837 | A1* | 4/2008 | Langen | H04L 65/40 709/230 |
| 2011/0225207 | A1* | 9/2011 | Subramanian | H04L 45/586 707/803 |
| 2012/0072893 | A1* | 3/2012 | Gupta | G06F 8/65 717/168 |
| 2013/0114613 | A1* | 5/2013 | Deshpande | H04L 45/586 370/401 |
| 2014/0304698 | A1* | 10/2014 | Chigurapati | G06F 8/65 717/171 |
| 2015/0049632 | A1* | 2/2015 | Padmanabhan | H04L 67/34 370/254 |

OTHER PUBLICATIONS

"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A- Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pp., Network Working Group, Request for Comments: 3260, the Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Z. Ali, et al., "Node-ID Based Resource Reservation Protocol (RSVP) Hello: A Clarification Statement," Jun. 2006, 7 pages, Network Working Group, Request for Comments: 4558, The Internet Society.
J. Babiarz, et al., "Configuration Guidelines for DiffServ Service Classes," Aug. 2006, 57 pages, Network Working Group, Request for Comments: 4594, The Internet Society.
L. Andersson, et al., "LDP Specification," Oct. 2007, 135 pages, Network Working Group, Request for Comments: 5036, The IETF Trust.

(56) References Cited

OTHER PUBLICATIONS

R. Coltun, et al., "OSPF for IPv6," Jul. 2008, 94 pages, Network Working Group, Request for Comments: 5340, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

METHOD AND APPARATUS FOR PERFORMING HITLESS UPDATE OF LINE CARDS OF A NETWORK DEVICE

FIELD

Embodiments of the invention relate to the field of packet networks; and more specifically, to the update of line cards of a network device.

BACKGROUND

Telecommunication and data services are becoming increasingly sensitive to interruption in service. Service providers, for example, strive for minimum network service disruption. However software updates (upgrades) of line cards of a network device cause a disruption of traffic. Conventional mechanisms for performing line card upgrades on physical network devices (e.g., routers) result in traffic disruption for a long period of time (typically for a few minutes). For example, a conventional method for upgrading a line card of a network device may include downloading a new image (i.e., the software update) on a standby redundant control plane of the network device and copying the configuration and operational state from an active control plane to the standby redundant control plane. A swap between the roles of the control planes is performed (i.e., the redundant control plane switches from a standby state to an active state, while the control plane switches from an active state to a standby state). The new image is then downloaded on the control plane, which is now in a standby state. The roles of the control planes are swapped once more such that the redundant control plane's state is switched back to standby and the control plane's state is switched back to active. The new image is then downloaded and installed on all line cards (that need the software update) and a reload of the line cards is performed.

Thus, under this conventional line card upgrade mechanism, traffic loss can be prevented by redirecting traffic to a secondary physical network device (e.g., secondary router) while the upgrade is being performed. For example, the physical routers can be operating in Inter-chassis redundancy (ICR) mode. This requires, however, manual intervention for each upgrade and redundant hardware of the same type (for each network device to be upgraded), which makes it an expensive solution.

SUMMARY

One general aspect includes a method, in a first network device that is communicatively coupled to a plurality of network devices in a network, of performing a software update of a line card of a second network device of the plurality of network devices without disruption to data traffic. The method includes causing a redundant control plane component of the second network device to be updated according to the software update. The method continues with causing the second network device to instantiate, based on the software update, a line card virtual machine (LC VM) that serves as a standby LC VM; and causing a third network device of the plurality of network devices to forward data traffic to both the line card and the LC VM of the second network device. The method further includes causing the second network device to update the line card according to the software update while processing the received data traffic using the LC VM.

One general aspect includes a first network device to be communicatively coupled to a plurality of network devices in a network, the first network device for performing a software update of a line card of a second network device of the plurality of network devices without disruption to the data traffic. The first network device includes a non-transitory computer readable medium to store instructions; and a processor coupled with the non-transitory computer readable medium to process the stored instructions. The first network device causes a redundant control plane component of the second network device to be updated according to the software update. The first network device further causes the second network device to instantiate, based on the software update, a line card virtual machine (LC VM) that serves as a standby LC VM. The first network device also causes a third network device of the plurality of network devices to forward data traffic to both the line card and the LC VM of the second network, and causes the second network device to update the line card according to the software update while processing the received data traffic using the LC VM.

One general aspect includes a non-transitory machine readable storage media having stored therein code that when executed by one or more processors causes a first network device that is communicatively coupled to a plurality of network devices in a network, to perform operations including: causing a redundant control plane component of a second network device of the plurality of network devices to be updated according to a software update; causing the second network device to instantiate, based on the software update, a line card virtual machine (LC VM) that serves as a standby LC VM; causing a third network device of the plurality of network devices to forward data traffic to both the line card and the LC VM of the second network device; and causing the second network device to update the line card according to the software update while processing the received data traffic using the LC VM.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
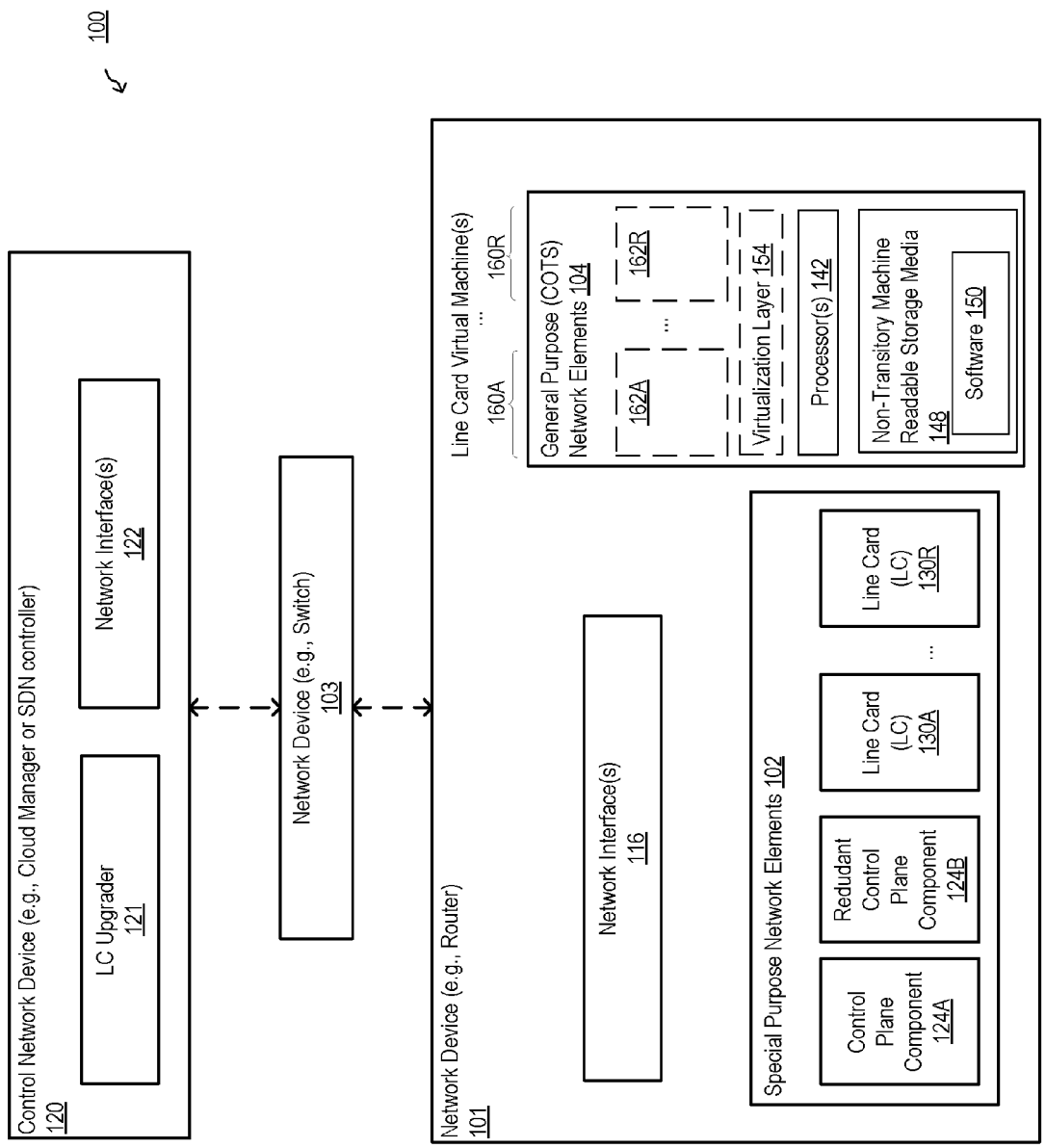
FIG. 1 illustrates a block diagram of an exemplary network device operative to perform a hitless software update of a line card in accordance with some embodiments.

The following description describes methods and apparatuses for performing a software update of a line card of a hybrid network device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 4A:
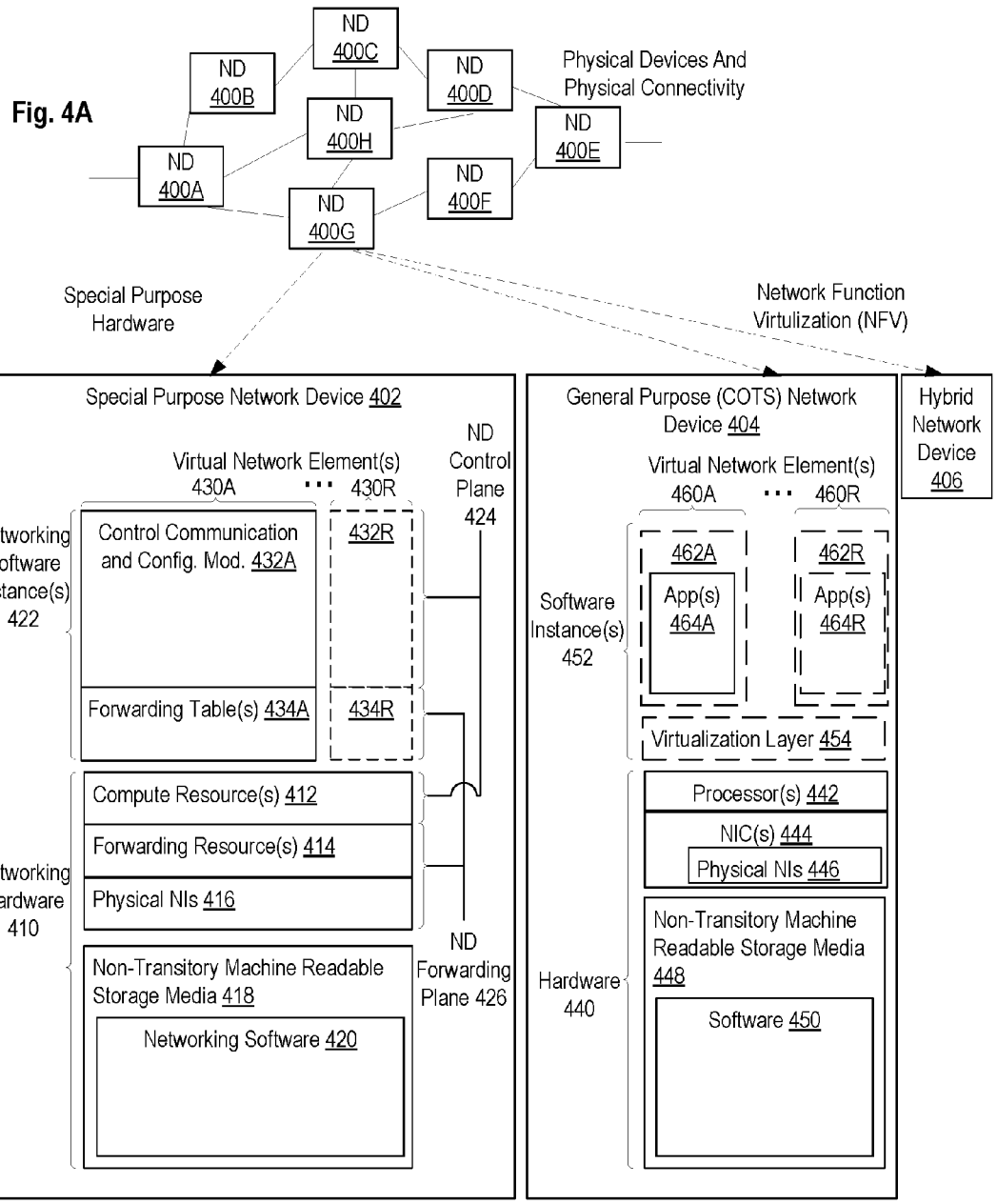
FIG. 4A illustrates connectivity between network devices (NDs) within an exemplary network, as well as three exemplary implementations of the NDs, according to some embodiments of the invention.

FIG. 4A illustrates connectivity between network devices (NDs) within an exemplary network, as well as three exemplary implementations of the NDs, according to some embodiments. FIG. 4A shows NDs 400A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are, 1) a special-purpose network device 402 that uses custom application-specific integrated-circuits (ASICs) and a proprietary operating system (OS); and 2) a general purpose network device 404 that uses common off-the-shelf (COTS) processors and a standard OS. The exemplary ND implementations will be described in further detail below with reference to FIG. 4A.

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 402) could provide for para-virtualization to the networking hardware present in the hybrid network device 406.

In some embodiments, a hybrid network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

The line cards, control cards, and/or service cards may be implemented as hardware cards. Under the network function virtualization (NFV) paradigm, these cards can be implemented as software entities (herein referred to as virtual machines (VMs)). In some embodiments, the network device can include, in addition to a set of hardware line cards and control cards, software stored on a non-transitory machine readable storage media, which when executed on a set of one or more processor(s) (which are often COTS processors) instantiate one or more line card virtual machines.

As set forth above, conventional methods for upgrading a line card in a network device require redundant hardware in order to prevent traffic loss while the upgrade is being performed, which makes it an expensive solution. Three upgrade scenarios can arise: (a) upgrading the network device with a control plane image only, (b) upgrading the network device with an Application image only, and (c) upgrading the network device with a control plane image and a line card (LC) image simultaneously. Note that scenario (a) (i.e., upgrading the control plane image alone) can be handled by conventional In-Service-Software-Upgrade (ISSU) without traffic disruption. Scenario (b) (i.e., upgrading Application image only) can be achieved in its own domain, independent of the control plane and LC upgrade. This invention applies to scenario (c) (i.e., upgrading the control plane and line card images simultaneously).

The present invention overcomes the limitations of the conventional methods for upgrading line cards. Under the NFV paradigm, network devices (e.g., routers) can be designed as hybrid solutions including physical line cards as well as software for instantiating line card virtual machines. The upgrade of controller cards (i.e., the control plane component of a network device) can be handled by having a redundant or standby control plane component. The upgrade of the line cards is performed with the use of a hybrid model for the network devices. As described above and in further detail below, the hybrid network device (or chassis) is a mix of the classic network device model and virtual network device architecture, where the backplane of the classic network device is extended to a virtual network device such that line card (LC) virtual machines (VMs) can act as slots for a physical chassis. Thus, the hybrid network device will have both physical line cards and virtual machines acting as line cards controlled with a control plane component (e.g., a controller card) of the classical network device. In the present embodiment, when the control plane components have been upgraded, the line card upgrade is performed by first switching all the traffic for the physical line card to an already updated LC VM, updating the physical line card with a new image, and then switching the traffic back to the physical line card.

Various embodiments of the present invention will now be illustrated through the description of the following figures, in which like references indicate similar elements.

FIG. 1 illustrates a block diagram of an exemplary network device operative to perform a hitless software update of a line card in accordance with some embodiments. In an example network configuration, traffic arrives at the network device 101 (which implements router functionality) from another network device 103 (e.g., a switch or router) and exits the same way. By way of illustration and not limitation, the network device 103 receives data traffic from the network. The data traffic is then sent by the network device 103 to one or more line cards (e.g., line cards 130A-R) on the network device 101. In one embodiment, the data traffic is then sent by the line cards back to the network device 103, which in turn, sends it to a destination (e.g., a service card or another network device). Throughout the description, data traffic is described as traversing from line card 130A to network device 103. It shall be appreciated that data traffic can traverse one or more other line cards within network device 101 prior to exiting to network device 103 or another network device (not illustrated). For example, data traffic may traverse between multiple line cards before exiting to network device 103 or another network device. In some exemplary embodiments, the network device 103 is a Top of the Rack (ToR) switch used in a data center network design (e.g., the network device 103 can be a feature-rich 10 GbE switch that handles L2 and L3 processing, data center bridging, and Fibre Channel over Ethernet (FCoE) for an entire rack of servers). While the embodiments of the invention are described in relation to the network device 101 receiving traffic through the network device 103, alternative embodiments could be implemented such that network device 101 receives traffic from other network devices (e.g., multiple switches, one or more bridges, etc.).

The network device 101 is coupled with control network device 120. In some embodiments the control network device 120 implements a cloud manager, while in other embodiments the control network device implements a Software-defined networking (SDN) controller. The control network device 120 includes a line card (LC) upgrader 121, and one or more network interface(s) 122. The LC upgrader 121 is operative to configure the network device 101 and to enable an upgrade of the network device 101 without disruption of traffic as will be described in further detail with reference to FIGS. 2A-3B. In some embodiments, the control network device 120 is an SDN controller and the communication between the control network device 120 and the network device 101 is performed through the OpenFlow protocol. In some embodiments the network device 120 is implemented as described in further detail with reference to FIGS. 4D and 5 and may include additional components not illustrated in FIG. 1.

In some embodiments, the network device 101 can be a router hosting multiple network functions/applications/services (such as L2/L3 P/PE, Subscriber Management, Carrier Grade Network Address Translation (CGNAT), Deep Packet Inspection (DPI), etc.). The network device 101 can also be a simple switch which does a layer 2 bridging/switching. The network device 101 includes one or more network interface(s) 116, special purpose network elements 102, and general purpose network elements 104. The special purpose network elements 102 include a control plane component 124A, a redundant control plane component 124B, and one or more Line Cards 130A-R. The general purpose network elements 104 includes one or more processor(s) 142, and non-transitory machine readable storage media 148 including software 150, which when executed by the one or more processor(s) 142 causes the execution of the virtualization layer 154 and the instantiations of one or more applications 162A-162R. In some embodiments, the instantiation of the software generates (with the hardware on which the applications run) one or more Line Card Virtual Machines 160A to 160R. In an embodiment, each of the control plane components, the line cards and the LC VMs are implemented as described in further details with reference to FIG. 4A (ND 402, ND 404, and ND 406).

Under the NFV paradigm, it is possible to spawn additional spare entities (i.e., VMs) before the original entities are taken out of service during an image release upgrade. This allows image upgrade to be performed without requiring additional hardware. Due to the modular nature of COTS servers, it is possible to scale the capacity as per traffic load. On COTS server hardware, it is possible to spawn additional (standby) line card VMs while the current routing system is still functional, without requiring additional identical hardware.

By way of illustration and not limitation, embodiments disclosed herein describe instantiating a VM to serve as a redundant line card to allow hitless update of a physical line card. However, it should be appreciated that the techniques disclosed herein apply more broadly to the use of general-purpose resources (e.g., compute servers) to provide temporary redundancy as needed for any type of functional component (FC) (physical or virtual), rather than having to dedicate resources for redundant FCs of each possible type used in a network. A planned outage provides one example application. During normal operation, an operator might have N FCs of some given type T, where an FC may be physical or virtual. In case of a planned outage, for example to perform software upgrade, a new virtualized network function (VNF) of type T could be created for temporary use to minimize the effect during the outage. As the N existing FCs were modified (e.g., upgraded), traffic could be moved to and from the temporary FC. When the work to be done during the planned outage is complete, the temporary FC could be deleted, thereby freeing that resource for other uses. In one embodiment, more than one temporary FC could be created, thus facilitating parallel execution of the work to be performed, e.g., during a planned outage.

Figure 2A:
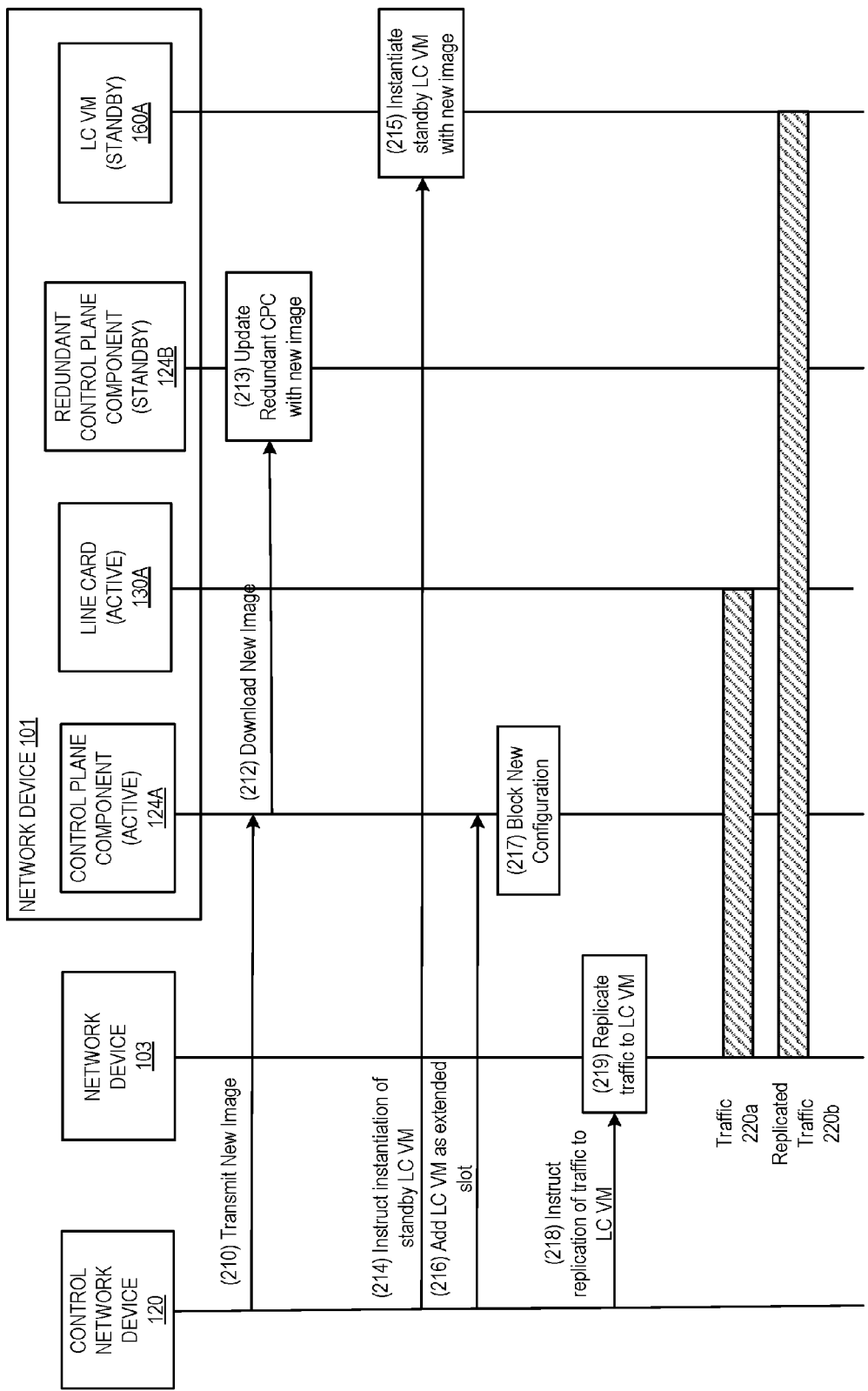
FIGS. 2A-C illustrate transactional diagrams of exemplary operations for performing hitless update of line cards of a network device in accordance with some embodiments.
Figure 2B:
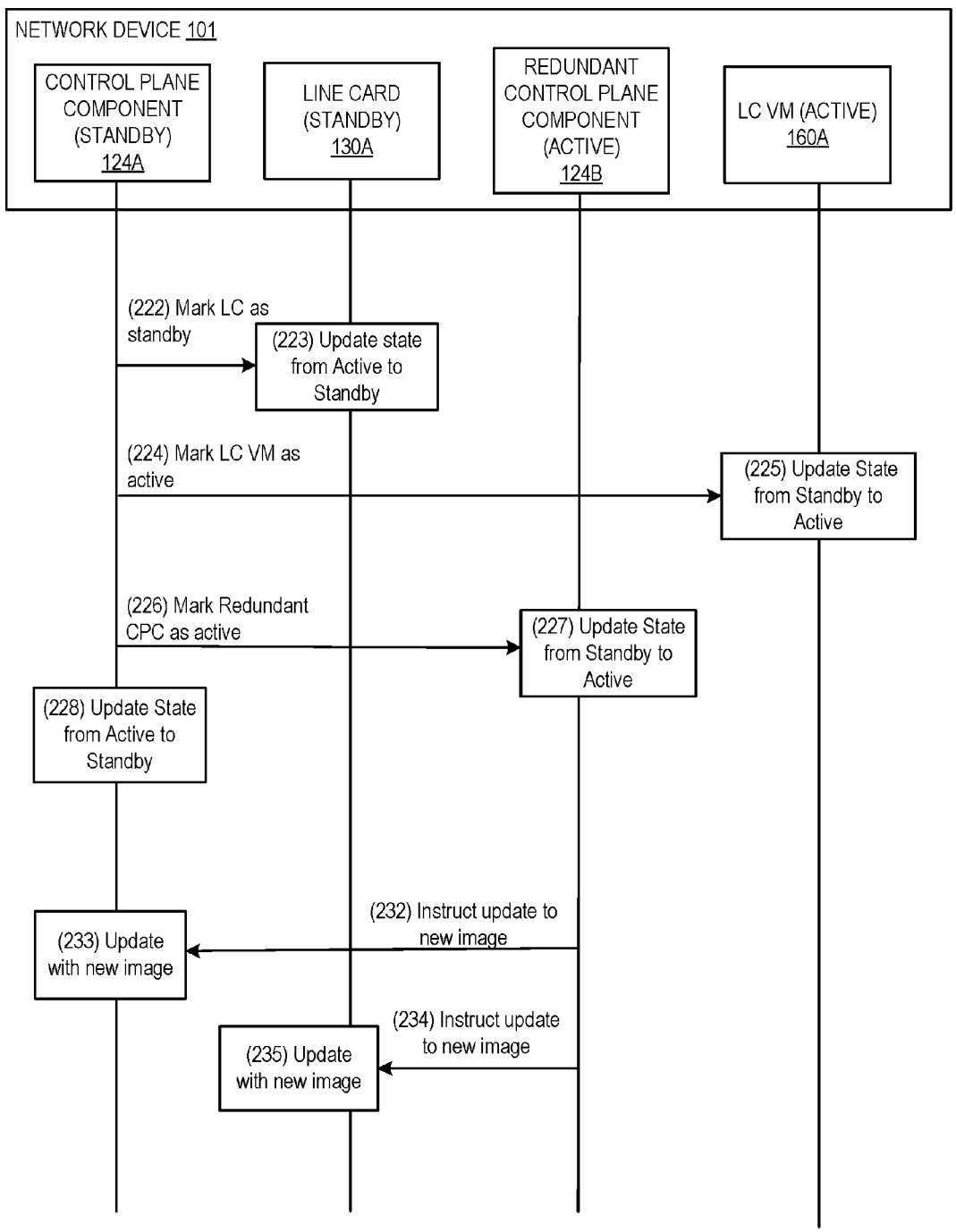
Figure 2C:
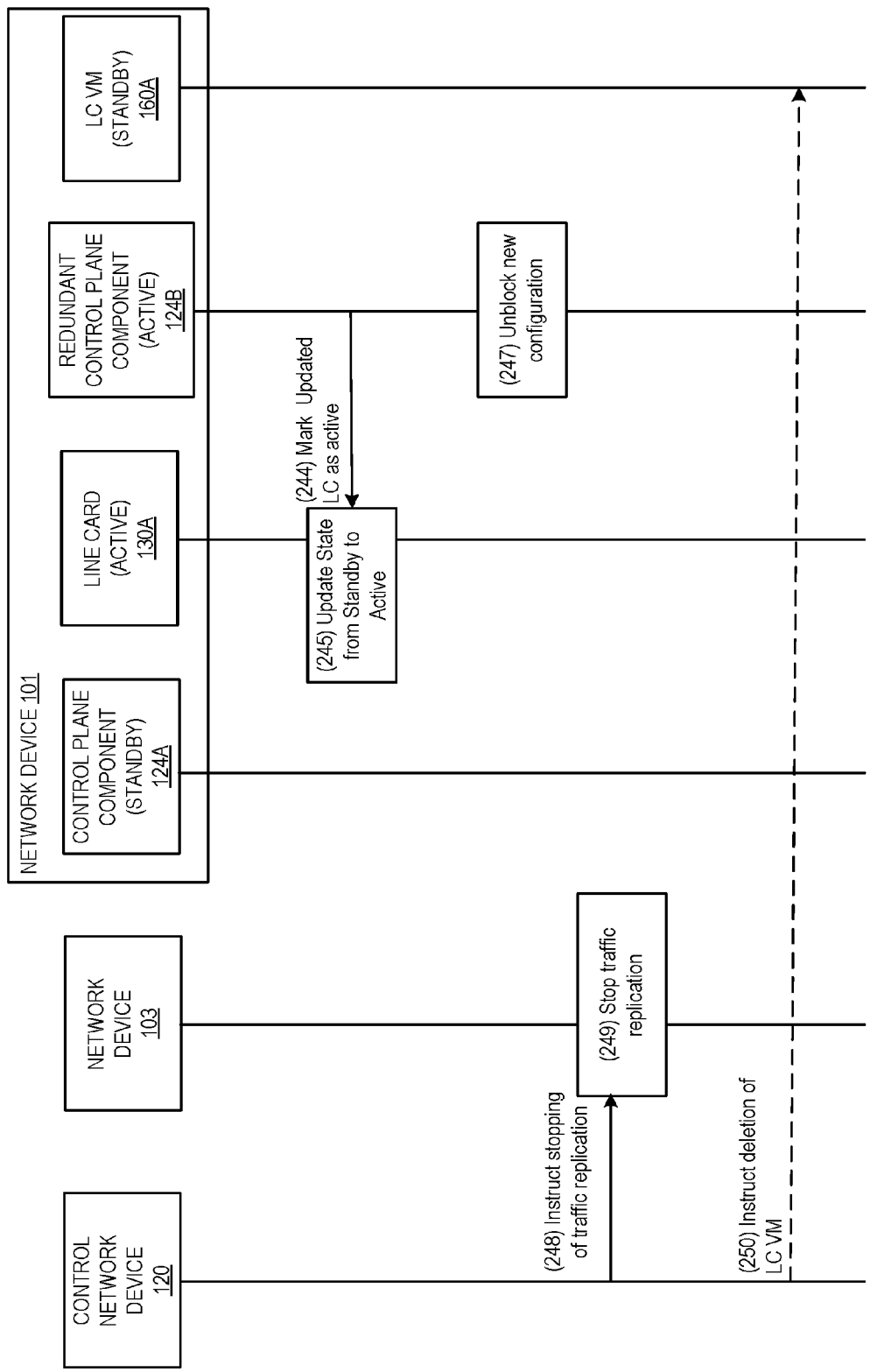

FIGS. 2A-C illustrate transactional diagrams of exemplary operations for performing hitless update of line cards of a network device in accordance with some embodiments. The operations are described with reference to components of the network 100 of FIG. 1. Certain details of network 100 have been omitted in order to avoid obscuring the invention. FIGS. 2A-C illustrate the update of the line card 130A. The update operations are grouped into three stages for illustrative purposes, and are not intended to be a limitation of the present invention. One having ordinary skill in the art would recognize that the update operations can be grouped into stages other than those illustrated in FIGS. 2A-C. In one embodiment, the update operations are driven (i.e., initiated/managed) by LC upgrader 121 of the control network device 120 of FIG. 1.

FIG. 2A assumes that network device 101 has an active LC (shown as active LC 130A). FIG. 2A further assumes that network device 101 includes control plane component 124A acting as an active control plane and a redundant control plane component 124B in a standby state. Prior to the image update, network traffic flows from network device 103 to active LC 130A. From LC 130A, data traffic flows back to network device 103. Network device 103 then forwards the data traffic to a node in the network (not illustrated), which may be the destination of the traffic.

At operation 210, a new image is transmitted (e.g., downloaded) from the control network device 120 to the control plane component 124A of the network device 101. At the time of receipt of the new image, the control plane component 124A is in an active state and is acting as the controller of the network device 101. In some embodiments, the new image is transmitted in response to the network device 101 receiving a request from the control network device 120 to download the new image and start the update process. Alternatively, the new image is transmitted in response to the network device 101 inquiring for any new configuration from the control network device 120. Flow then moves to operation 212 at which the new image is downloaded to the redundant control plane component (CPC) 124B, causing the redundant control plane component (which is in a standby state) to be updated with the new image at operation 213.

The control network device 120 causes (e.g., by instructing or configuring the network device 101) the instantiation of a standby LC VM for each active LC that currently exists at the network device 101 and which needs to be updated. In other embodiments, a single standby LC VM is instantiated for all active LCs of a particular type T that need updating, and update of the active LCs occurs serially with traffic intended for an updating LC being processed by the LC VM. In this example, at operation 214, the control network device 120 causes the new image to be used to instantiate (operation 215 at the network device 101) standby LC VM 160A, which emulates an updated (e.g., upgraded) version of active LC 130A. Each LC VM (e.g., LC VM 160A) may then be added (operation 216) as an extended slot to control plane component 124A (i.e., the LC VM will now be treated as a line card of the network device 101). In an embodiment, the LC VM is referred to as an extended slot as there is no physical slot for a VM.

Flow then moves to block 217 where the control plane component 124A blocks all external configurations to network device 101. As used herein, external configurations are configurations other than those required as part of the update process. External configurations can originate from a user/administrator, and/or from a service application. By blocking the external configurations, the control plane component 124A prevents the line cards (e.g., line card 130A) from changing operational states during the update process.

In some embodiments, the system states of active control plane component 124A are copied to redundant control plane component 124B. As used herein, system states refer to the configuration/static states and operational/dynamic states. In one embodiment, as part of this operation, the system states that are copied include the configuration, or operational states, or any combination thereof. In one embodiment, the system states of control plane component 124A and redundant control plane component 124B are already in sync. In an embodiment where they are not in sync, the system states of control plane component 124A are copied to redundant control plane component 124B, where the copied system states may include configuration states, or operational states, or any combination thereof.

At operation 218, the control network device 120 causes (e.g., instructs or configures) network device 103 to replicate data traffic intended for active LC 130A and send (operation 219 at network device 103) the data traffic 220a to active LC 130A and the replicated data traffic 220b to standby LC VM 160A. In some embodiments, the replication of traffic can be used to incubate the new setup (i.e., redundant control plane component 124B and LC VM 160A) with live state updates. As used herein, incubating refers to the forwarding of live data traffic to redundant control plane component 124B and LC VM 160A until their configuration (e.g., static) states and operational (e.g., dynamic) states stabilize to the same states as active control plane component 124A and LC 130A, respectively.

According to one embodiment, the control network device 120 configures network device 103 to replicate data by adding forwarding entries of multicast. In yet another embodiment, the control network device 120 configures entries for multicast on network device 103 with certain timeout duration. These forwarding entries are then removed. This could be done either using special multicast address—or more than one unicast address—to which to forward traffic.

Flow then moves to the operations of FIG. 2B. At operation 222, the control plane component 124A configures/marks LC 130A (which is in an active state) to be updated/switched to a standby state. In some embodiments, when the state of the LC 130A is updated from active to standby (at operation 223), the LC 130A starts dropping the traffic received from the network device 103. At operation 224, the control plane component 124A configures/marks LC VM 160A to be updated/switched to an active state. Thus the state of the LC VM 160A is updated from standby to active (at operation 225), and the LC VM 160A starts processing (e.g., forwarding) the replicated traffic received from the network device 103. Flow then moves to operation 226, where the control plane component 124A configures/marks the redundant control plane component 124B to be updated/switched to an active state. The update of the state of the redundant control plane component 124B from a standby state to the active state causes the redundant control plane component 124B to take control of the network device 101. Flow then moves to operation 228, where the state of the control plane component 124A is updated/switched from active to standby. At this stage of the update process, the redundant control plane component 124B and the LC VM 160A, are both in an active state and operate according to the new image. Flow then moves to operation 232 where the redundant control plane component 124B, which is now operating as the controller of the network device 101, instructs/configures the control plane component 124A to update to the new image. At operation 233, the control plane component 124A is updated to the new image. At operation 234, the redundant control plane component 124B instructs/configures the LC 130A to update to the new image causing the LC to be updated at operation 235. In FIG. 2B, the state of each illustrated element of the network device 101 indicates the current state of the element at the end of the operations. For example, the control plane component 124A is in an active state while performing all the operations occurring prior to operation 228 at which the state of the control plane component 124A is switched to a standby state. Thus, the state of control plane component 124A is indicated as "standby," corresponding to its state at the end of the process described in FIG. 2B. Similarly, the state of the line card 130A is an active state prior to being updated to a standby state at operation 223. In contrast, the state of each of the redundant control plane component 124B and LC VM 160A starts as a standby state and is updated to an active state at operations 227 and 225 respectively. At the end of the operations of FIG. 2B, the LC 130A is updated, and the update was performed without any disruption of traffic at the network device 101 because the LC VM 160A in active state processed the replicated traffic received from the network device 103.

Referring now to FIG. 2C, at operation 244 the redundant control plane component 124B configures/marks LC 130A to update/switch state from standby to active. At operation 245, the update of the state of the LC 130A from standby to active causes the LC to process (e.g., forward) the traffic received from the network device 103, while replicated traffic received at the LC VM 160A is dropped. While not illustrated the operations may further include an operation performed by the redundant control plane component 124B to configure/mark the LC VM 160A as a standby LC VM. At operation 247, redundant control plane component 124B unblocks external configurations to the network device 101. In some embodiments, the control network device 120 instructs the network device 101 to delete the LC VM 160A. In another embodiment, the state of the LC VM 160A is updated/switched to a standby state and it is not deleted. According to one embodiment, at this point, the image LC update process is completed. Thus, after the update operations have been completed, data traffic from network device 103 is sent to updated active LC 130A. The data traffic may then be processed and sent back out to network device 103 or to another network device 103, which may forward it to another node (e.g., a destination node for the data traffic) of the network, which can be a Service Card (SC) or any network device in the network. Flow then moves to operation 248, where the control network device 120 instructs/configures the network device 103 to stop replicating traffic. The network device 103 stops at operation 249 the replication of the traffic and starts transmitting (not illustrated) the traffic to the updated active LC 130A only. At optional operation 250, the control network device 120 may instruct the network device 101 to delete the LC VM 160A. In other embodiments, the control network device 120 does not perform this operation and the LC VM is not deleted, however the LC VM is now in a standby state dropping any traffic that may be received.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3A:
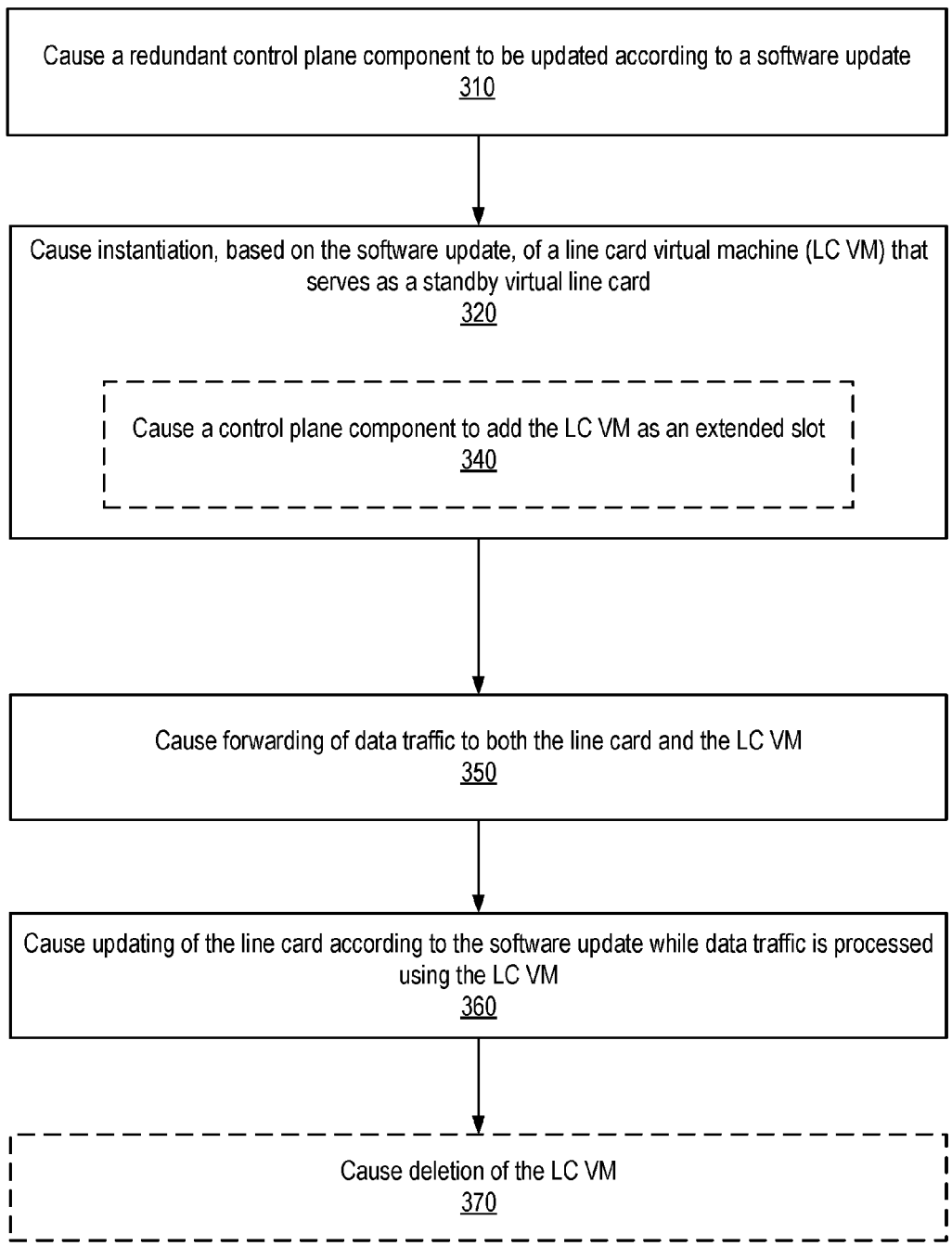
FIG. 3A illustrates a flow diagram of exemplary operations for enabling a hitless software update of a line card in a network device in accordance with some embodiments.

FIG. 3A illustrates a flow diagram of exemplary operations for enabling a hitless software update of a line card in a network device in accordance with some embodiments. FIG. 3A illustrates a flow diagram of exemplary operations performed at the control network device 120. At operation 310, the control network device 120 causes a redundant control plane component (e.g., redundant control plane component 124B) of a network device 101 to be updated according to a software update to be installed at the network device 101. At operation 320, the control network device 120 causes (e.g., configures) the network device 101 to instantiate, based on the software update, a line card virtual machine (e.g., LC VM 160A) that serves as a standby LC VM (i.e., a redundant data plane component). At operation 340, the control network device 120 may cause the network device 101 to configure the control plane component 124A to add the LC VM 160A as an extended slot. At operation 350, the control network device 120 causes (e.g., configures) the network device 103 (e.g., a switch or router) to forward data traffic to both the line card (e.g., LC 130A) and the LC VM (e.g., 160A), and causes at operation 360 the network device 101 to update the line card according to the software update while using the LC VM to process the data traffic forwarded from the network device 103. In some embodiments, at optional operation 370, the control network device 120 causes (e.g., configures) the network device 101 to delete the LC VM 160A. In other embodiments, the control network device 120 does not instruct the network device 101 to delete the LC VM 160A; instead the LC VM's state is updated to a standby state causing the LC VM to drop any traffic that may be received.

Figure 3B:
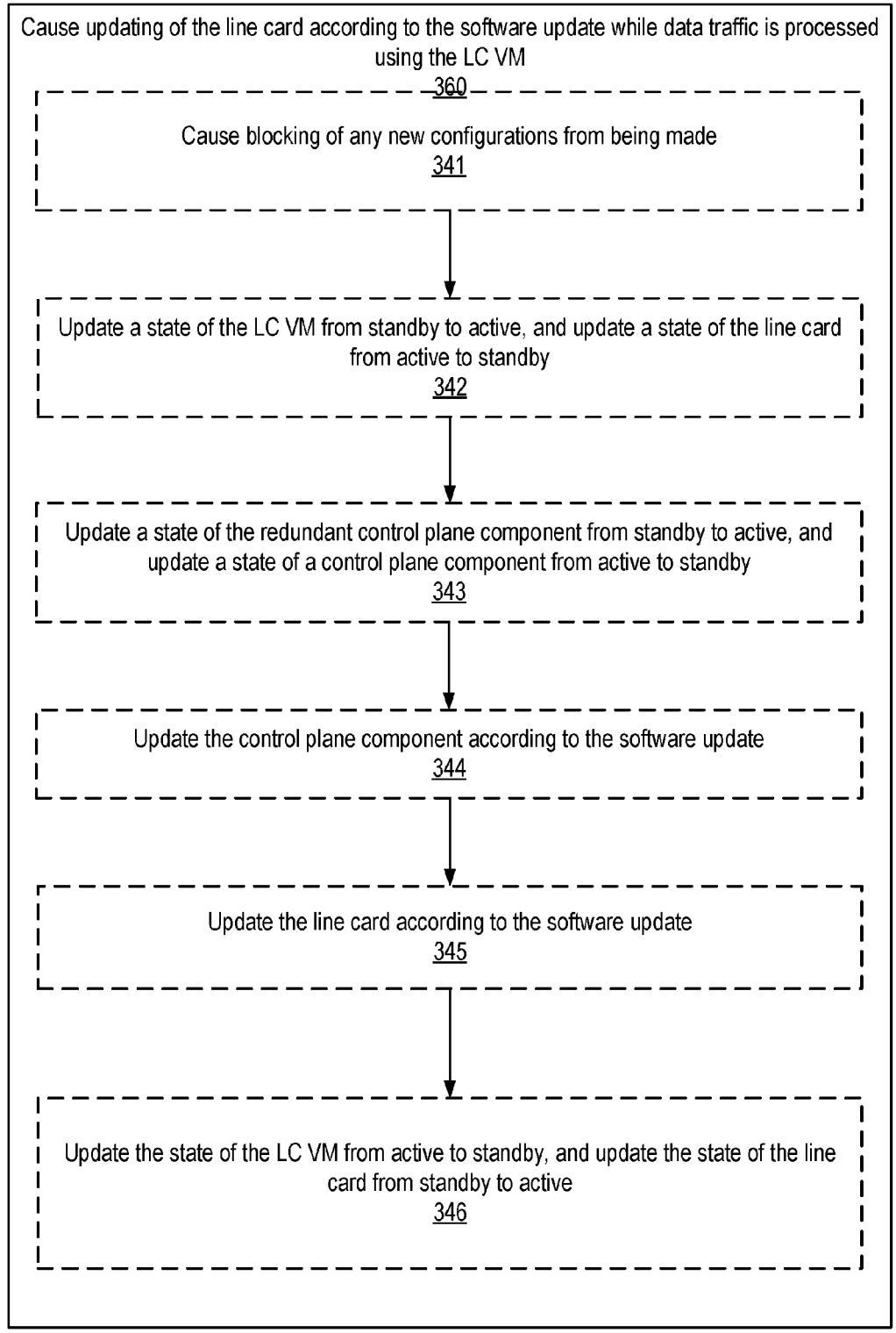
FIG. 3B illustrates a flow diagram of exemplary operations for causing a network device to update a line card in accordance with some embodiments.

FIG. 3B illustrates a flow diagram of exemplary operations 360 for causing the network device 101 to update a line card in accordance with some embodiments. At operation 341, the network device 101 is caused (e.g., configured) to block any new configuration from being made in order to prevent the line card and the LC VM from changing operational states during the update process. At operation 342, the network device 101 is caused to update a state of the LC VM from standby to active LC, and update a state of the line card from active to standby, thereby causing replicated traffic received at the LC VM to be processed (e.g., forwarded to the network) and the traffic received at the line card to be dropped. At operation 343, the network device 101 is caused to update a state of the redundant control plane component from standby to active, and update a state of a control plane component from active to standby. At operation 344, the network device 101 is caused to update the control plane component according to the software update. At operation 345, the network device 101 is caused to update the line card according to the software update. At operation 346, the network device 101 is caused to update the state of the line card from standby to active, and update the state of the LC VM from active to standby, thereby causing replicated traffic received at the LC VM to be dropped and the traffic received at the line card to be processed (e.g., forwarded to the network) according to the software update.

While embodiments of the invention are described with reference to line card 130A being updated, one may understand that any number of line cards can be updated serially or simultaneously using the mechanisms presented herein. In some embodiments, multiple line cards can be updated (e.g., upgraded) at once using different LC VMs. Alternatively multiple line cards can be updated one at a time using the same LC VM for similar types of line cards without causing any traffic disruption.

The mechanisms of the present invention for updating (e.g., upgrading) line cards of a network device using a hybrid network device have many advantages. For example, by using the present mechanisms, line card update can be performed without a disruption to the data traffic flow, without the need for additional, expensive, redundant hardware (i.e., spare redundant line cards), and without a manual intervention for replacing the line card. Further, the update process described herein is hitless for customer data traffic terminating on line cards of already deployed classic network devices. In addition, the present invention enables the control plane and line cards version consistency to be maintained. Another advantage is that the present invention does not need separate specialized hardware for each type of LC present in the node. The LC VM can be instantiated as any type of line card.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
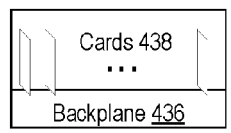
FIG. 4B illustrates an exemplary way to implement a special-purpose network device according to some embodiments of the invention.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization—represented by a virtualization layer 454 and software containers 462A-R. For example, one such alternative embodiment implements operating system-level virtualization, in which case the virtualization layer 454 represents the kernel of an operating system (or a shim executing on a base operating system) that allows for the creation of multiple software containers 462A-R that may each be used to execute one of the sets of applications 464A-R. In this embodiment, the multiple software containers 462A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 454 represents a hypervisor (sometimes referred to as a virtual machine monitor (VMM)) or a hypervisor executing on top of a host operating system; and 2) the software containers 462A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 464A-R, as well as the virtualization layer 454 and software containers 462A-R if implemented, are collectively referred to as software instance(s) 452. Each set of applications 464A-R, corresponding software container 462A-R if implemented, and that part of the hardware 440 that executes them (be it hardware dedicated to that execution and/or time slices of hardware temporally shared by software containers 462A-R), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 462A-R differently. For example, while embodiments of the invention are illustrated with each software container 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 462A-R to VNEs also apply to embodiments where such a finer level of granularity is used.

In certain embodiments, the virtualization layer 454 includes a virtual switch that provides similar forwarding services as a physical Ethernet switch. Specifically, this virtual switch forwards traffic between software containers 462A-R and the NIC(s) 444, as well as optionally between the software containers 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 402) could provide for para-virtualization to the networking hardware present in the hybrid network device 406. In some embodiments, the hybrid network device 406 is the network device 101 of FIG. 1 and is operative to perform the operations of the embodiments described with reference to FIGS. 1-3B.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 4C:
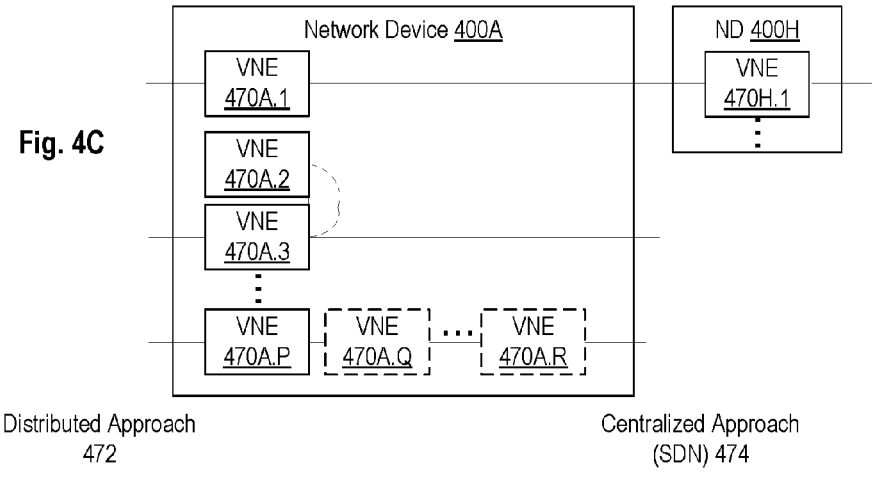
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service— e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software containers 462A-R may operate as servers; the same would be true for the hybrid network device 406; in the case of the special-purpose network device 402, one or more such servers could also be run on a virtualization layer executed by the compute resource(s) 412); in which case the servers are said to be co-located with the VNEs of that ND.

Figure 4D:
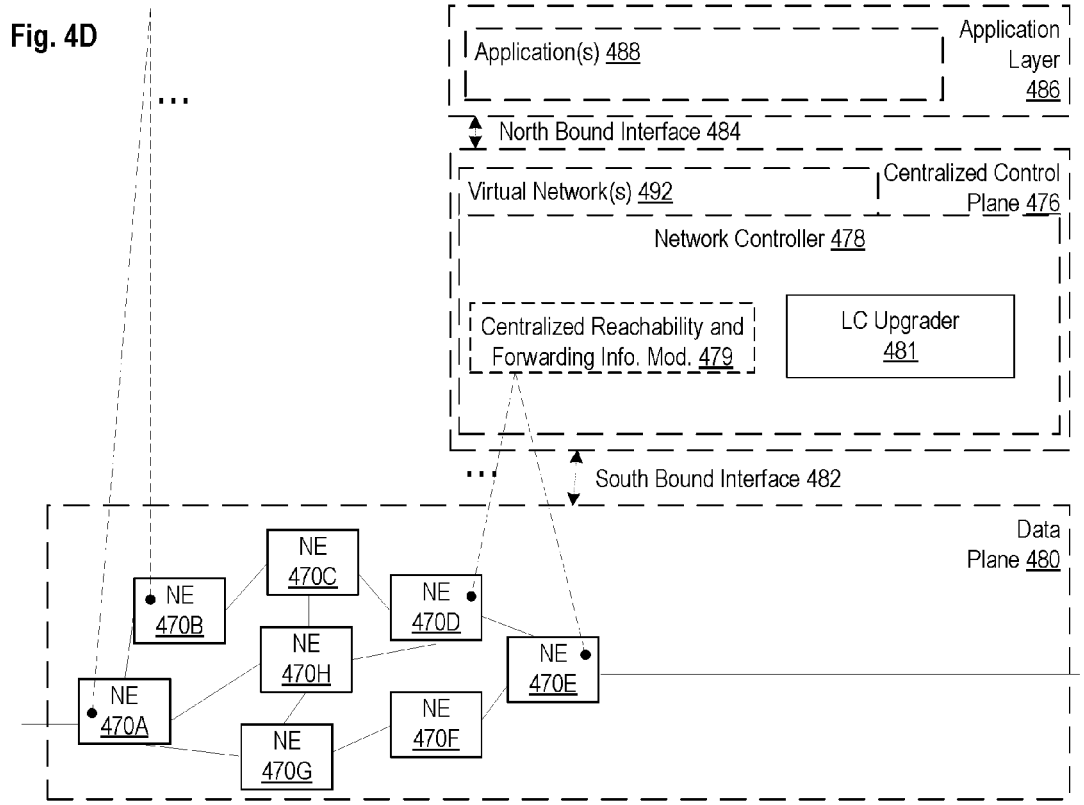
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs. The network controller 478 further includes the LC upgrader 481 which enables the network controller to initiate a hitless upgrade of a line card in a hybrid network device from the data plane 480. The LC upgrader 481 is operative to perform the operations as described with reference to FIGS. 1-3B.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

Figure 4E:
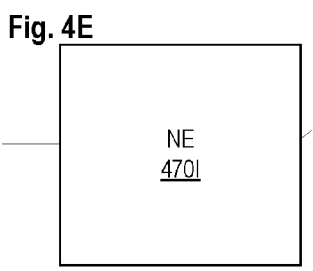
FIG. 4E illustrates the simple case of where each of the NDs implements a single NE, but a centralized control plane has abstracted multiple of the NEs in different NDs into (to represent) a single NE in one of the virtual network(s), according to some embodiments of the invention.
Figure 4F:
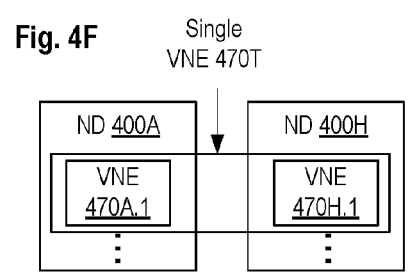
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
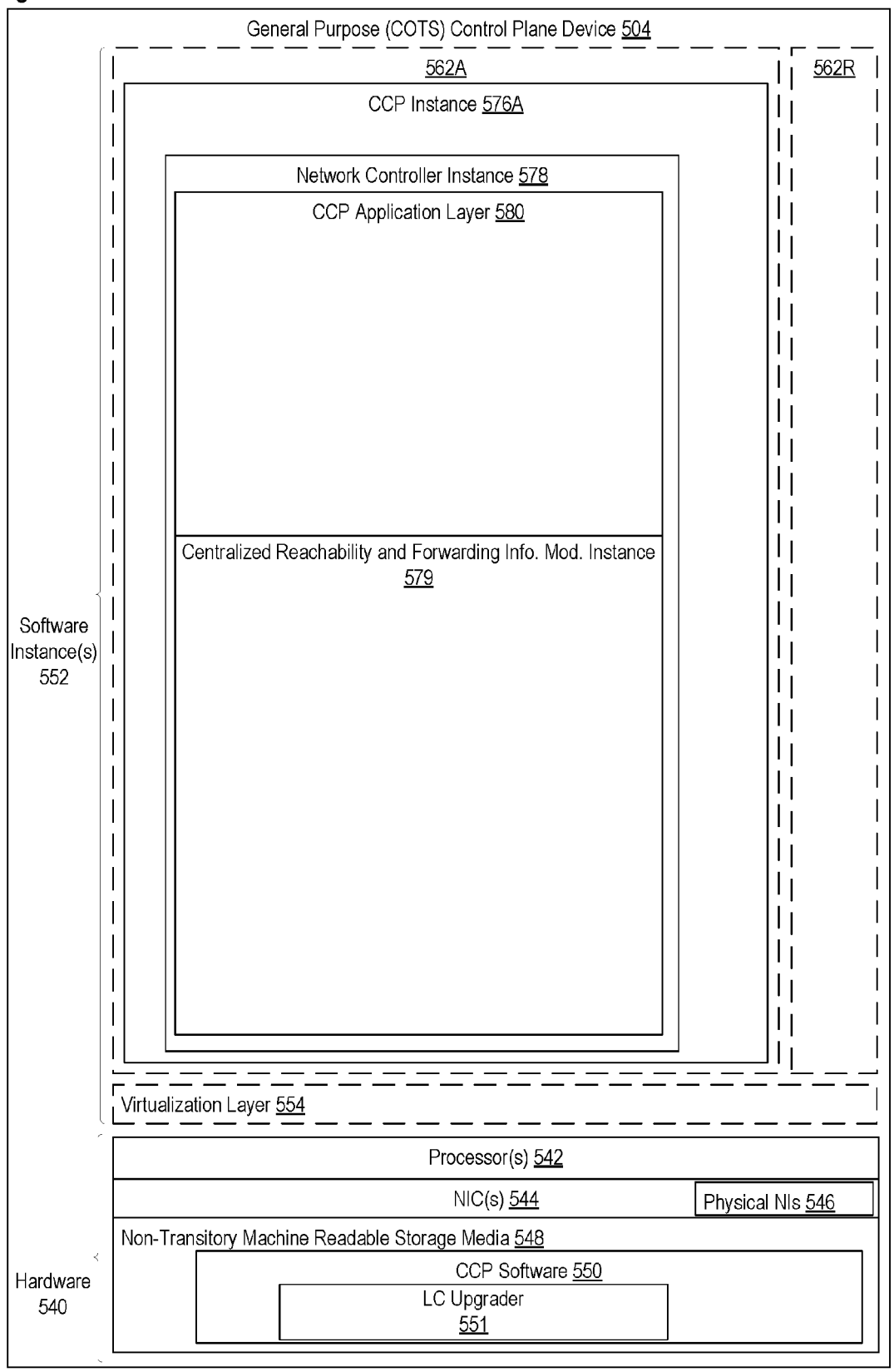
FIG. 5 illustrates a general purpose control plane device with centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a virtualization layer 554 and software container(s) 562A-R (e.g., with operating system-level virtualization, the virtualization layer 554 represents the kernel of an operating system (or a shim executing on a base operating system) that allows for the creation of multiple software containers 562A-R (representing separate user space instances and also called virtualization engines, virtual private servers, or jails) that may each be used to execute a set of one or more applications; with full virtualization, the virtualization layer 554 represents a hypervisor (sometimes referred to as a virtual machine monitor (VMM)) or a hypervisor executing on top of a host operating system, and the software containers 562A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 550 (illustrated as CCP instance 576A) is executed within the software container 562A on the virtualization layer 554. In embodiments where compute virtualization is not used, the CCP instance 576A on top of a host operating system is executed on the "bare metal" general purpose control plane device 504. The instantiation of the CCP instance 576A, as well as the virtualization layer 554 and software containers 562A-R if implemented, are collectively referred to as software instance(s) 552. In some embodiments, the CCP software 550 includes the LC upgrader 551 which enables the network controller, when an instance of the CCP software 550 is executed, to initiate a hitless upgrade of a line card in a hybrid network device from the data plane 480. The LC upgrader 551 is operative to cause the instance 576A to perform operations as described with reference to FIGS. 1-3B.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user-interfaces). At a more abstract level, this CCP application layer 580 within the centralized control plane 476 works with virtual network view(s) (logical view(s) of the network) and the middleware layer provides the conversion from the virtual networks to the physical view.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a first network device that is communicatively coupled to a plurality of network devices in a network, of performing a software update of a physical line card of a second network device of the plurality of network devices without disruption to data traffic, the method comprising:
   causing a redundant control plane component of the second network device to be updated according to the software update;
   causing the second network device to instantiate, based on the software update, a line card virtual machine (LC VM) that serves as a standby LC VM;
   causing a third network device of the plurality of network devices to forward data traffic to both the physical line card and the LC VM of the second network device, wherein causing the third network device to forward data traffic to both the line card and the LC VM includes causing the third network device to replicate data traffic to be transmitted to the physical line card by adding forwarding entries of multicast and transmitting the replicated data traffic to the LC VM; and
   causing the second network device to update the physical line card according to the software update while processing the received data traffic using the LC VM.

2. The method of claim 1, wherein causing the second network device to update the physical line card further includes causing the second network device to perform the following operations:
   updating a state of the LC VM from standby to active, and updating a state of the physical line card from active to standby,
   updating a state of the redundant control plane component from standby to active, and updating a state of a control plane component of the second network device from active to standby,
   updating the control plane component according to the software update,
   updating the physical line card according to the software update, and
   updating the state of the LC VM from active to standby, and updating the state of physical line card from standby to active.

3. The method of claim 1, wherein causing the second network device to update the physical line card further includes causing the second network device to block any new configurations from being made.

4. The method of claim 3, wherein causing the second network device to update the physical line card further includes causing the second network device to enable new configurations following the updating of the line card according to the software update.

5. The method of claim 1 further comprising, prior to causing the second network device to update the physical line card, causing the second network device to configure a control plane component of the second network device to add the LC VM as an extended slot.

6. The method of claim 1 further comprising causing the second network device to delete the LC VM.

7. A first network device to be communicatively coupled to a plurality of network devices in a network, the first network device for performing a software update of a physical line card of a second network device of the plurality of network devices without disruption to data traffic, the first network device comprising:
   a non-transitory computer readable medium to store instructions; and
   a processor coupled with the non-transitory computer readable medium to process the stored instructions to:
      cause a redundant control plane component of the second network device to be updated according to the software update,
      cause the second network device to instantiate, based on the software update, a line card virtual machine (LC VM) that serves as a standby LC VM,
      cause a third network device of the plurality of network devices to forward data traffic to both the physical line card and the LC VM of the second network device, wherein to cause the third network device to forward data traffic to both the line card and the LC VM includes to cause the third network device to replicate data traffic to be transmitted to the physical line card by adding forwarding entries of multicast and transmitting the replicated data traffic to the LC VM, and
      cause the second network device to update the physical line card according to the software update while processing the received data traffic using the LC VM.

8. The first network device of claim 7, wherein to cause the second network device to update the line physical card further includes causing the second network device to perform the following operations:
   updating a state of the LC VM from standby to active, and updating a state of the physical line card from active to standby,
   updating a state of the redundant control plane component from standby to active, and updating a state of a control plane component of the second network device from active to standby,
   updating the control plane component according to the software update,
   updating the physical line card according to the software update, and
   updating the state of the LC VM from active to standby, and updating the state of the physical line card from standby to active.

9. The first network device of claim 7, wherein to cause the second network device to update the physical line card further includes causing the second network device to block any new configurations from being made.

10. The first network device of claim 9, wherein to cause the second network device to update the physical line card further includes causing the second network device to enable new configurations following the updating of the physical line card according to the software update.

11. The first network device of claim 7, wherein the processor is further to process the stored instructions, prior to causing the second network device to update the physical line card, to cause the second network device to configure a control plane component of the second network device to add the LC VM as an extended slot.

12. The first network device of claim 7, wherein the processor is further to process the stored instructions to cause the second network device to delete the LC VM.

13. A non-transitory machine readable storage media having stored therein code that when executed by one or more processors causes a first network device that is communicatively coupled to a plurality of network devices in a network, to perform operations comprising:
   causing a redundant control plane component of a second network device of the plurality of network devices to be updated according to a software update;

causing the second network device to instantiate, based on the software update, a line card virtual machine (LC VM) that serves as a standby LC VM;

causing a third network device of the plurality of network devices to forward data traffic to both a physical line card and the LC VM of the second network device, wherein causing the third network device to forward data traffic to both the line card and the LC VM includes causing the third network device to replicate data traffic to be transmitted to the physical line card by adding forwarding entries of multicast and transmitting the replicated data traffic to the LC VM; and causing the second network device to update the physical line card according to the software update while processing the received data traffic using the LC VM.

14. The non-transitory machine readable storage media of claim 13, wherein causing the second network device to update the physical line card further includes causing the second network device to perform the following operations:

updating a state of the LC VM from standby to active, and updating a state of the physical line card from active to standby, updating a state of the redundant control plane component from standby to active, and updating a state of a control plane component of the second network device from active to standby, updating the control plane component according to the software update, updating the physical line card according to the software update, and updating the state of the LC VM from active to standby, and updating the state of the physical line card from standby to active.

15. The non-transitory machine readable storage media of claim 13, wherein causing the second network device to update the physical line card further includes causing the second network device to block any new configurations from being made.

16. The non-transitory machine readable storage media of claim 15, wherein causing the second network device to update the physical line card further includes causing the second network device to enable new configurations following the updating of the physical line card according to the software update.

17. The non-transitory machine readable storage media of claim 13, wherein the operations further comprise, prior to causing the second network device to update the physical line card, causing the second network device to configure a control plane component of the second network device to add the LC VM as an extended slot.

18. The non-transitory machine readable storage media of claim 13, wherein the operations further comprise causing the second network device to delete the LC VM.

* * * * *